(12) United States Patent
Lamoureux et al.

(10) Patent No.: US 9,573,435 B2
(45) Date of Patent: Feb. 21, 2017

(54) DUAL INLINE HYDRAULIC DEVICE

(71) Applicant: Elka Suspension Inc., Bourcherville (CA)

(72) Inventors: Martin Lamoureux, Saint-Basile-le-Grand (CA); Nicolas Rousseau, Saint-Marc-sur-Richelieu (CA); Patrick Tellier, Longueuil (CA)

(73) Assignee: Elka Suspension Inc., Boucherville, Quebec (CA)

( * ) Notice: Subject to any disclaimer, the term of this patent is extended or adjusted under 35 U.S.C. 154(b) by 0 days.

(21) Appl. No.: 14/327,036

(22) Filed: Jul. 9, 2014

(65) Prior Publication Data

US 2015/0091261 A1 Apr. 2, 2015

Related U.S. Application Data

(60) Provisional application No. 61/884,070, filed on Sep. 29, 2013.

(51) Int. Cl.

| | |
|---|---|
| *B60G 17/016* | (2006.01) |
| *B60G 21/073* | (2006.01) |
| *B62M 27/02* | (2006.01) |
| *B60G 3/20* | (2006.01) |
| *B60G 17/0165* | (2006.01) |

(52) U.S. Cl.
CPC ............ *B60G 17/0162* (2013.01); *B60G 3/20* (2013.01); *B60G 17/016* (2013.01); *B60G 17/0165* (2013.01); *B60G 21/073* (2013.01); *B29C 2945/7604* (2013.01); *B29C 2945/7628* (2013.01); *B29C 2945/76274* (2013.01); *B29C 2945/76277* (2013.01); *B60G 2200/144* (2013.01); *B60G 2300/322* (2013.01); *B60G 2500/30* (2013.01); *B60G 2500/42* (2013.01); *B62M 2027/026* (2013.01)

(58) Field of Classification Search
CPC .................... B62M 2027/026; B60G 17/0162; B60G 2300/322; B60G 2500/30; B60G 2500/42; B62K 5/10; B62D 9/02; B62D 9/04
USPC .................... 280/5.51, 124.103, 5.52, 5.514, 6.155, 280/6.157, 124.161; 267/218; 188/299.1
See application file for complete search history.

(56) References Cited

U.S. PATENT DOCUMENTS

| | | | |
|---|---|---|---|
| 1,628,811 A | 5/1927 | Shultz et al. | |
| 1,957,997 A | 5/1934 | Fieldman | |
| 2,009,678 A | 7/1935 | Pennington | |
| 3,653,682 A * | 4/1972 | Palmer .................. | B60G 13/06 267/64.26 |

(Continued)

*Primary Examiner* — Ruth Ilan
(74) *Attorney, Agent, or Firm* — Price Heneveld LLP (57) ABSTRACT

A system for varying an eyelet-to-eyelet distance of a vehicle. The system includes top and bottom mounting components defining the eyelet-to-eyelet distance, the top mounting component being operatively connected to a frame of the vehicle, and the bottom mounting component being operatively connected to a supporting component of the vehicle. The system also includes a telescopic component disposed about a housing of at least one of the top and bottom components, the telescopic component being displaceable with respect to said housing in response to a given input of a driver of the vehicle, for varying a distance between the top and mounting components, and thus varying the eyelet-to-eyelet distance of the vehicle. Also described is a vehicle including such a system, and a method of operating associated thereto.

16 Claims, 7 Drawing Sheets

(56) References Cited

U.S. PATENT DOCUMENTS

| | | | | |
|---|---|---|---|---|
| 4,361,339 A * | 11/1982 | Kobayashi | B62B 13/10 | |
| | | | 267/64.15 | |
| 4,489,954 A * | 12/1984 | Yasui | B62B 17/04 | |
| | | | 180/190 | |
| 4,659,106 A * | 4/1987 | Fujita | B60G 21/007 | |
| | | | 280/124.103 | |
| 4,685,690 A * | 8/1987 | Fujita | B60G 21/007 | |
| | | | 280/124.103 | |
| 4,773,514 A | 9/1988 | Gustafsson | | |
| 4,804,198 A * | 2/1989 | Imai | B62B 17/04 | |
| | | | 280/124.127 | |
| 4,830,395 A * | 5/1989 | Foley | B60G 17/0272 | |
| | | | 267/177 | |
| 4,993,744 A * | 2/1991 | Hiromoto | B60G 17/0162 | |
| | | | 188/266.5 | |
| 5,044,614 A | 9/1991 | Rau | | |
| 5,086,866 A * | 2/1992 | Banjo | B60G 17/017 | |
| | | | 180/219 | |
| 5,161,823 A * | 11/1992 | Davidson | B60G 17/0162 | |
| | | | 280/124.161 | |
| 5,201,384 A * | 4/1993 | Kiyota | B60G 17/033 | |
| | | | 180/219 | |
| 5,516,133 A | 5/1996 | Motrenec et al. | | |
| 5,533,586 A * | 7/1996 | Thompson | F16F 9/56 | |
| | | | 180/193 | |
| 5,586,781 A * | 12/1996 | Anderson | B60G 17/0152 | |
| | | | 267/64.17 | |
| 5,664,649 A * | 9/1997 | Thompson | F16F 9/46 | |
| | | | 180/193 | |
| 6,079,725 A * | 6/2000 | Lazaros | A61G 5/08 | |
| | | | 188/301 | |
| 6,253,867 B1 * | 7/2001 | Lillbacka | B60G 15/12 | |
| | | | 180/193 | |
| 6,267,387 B1 * | 7/2001 | Weiss | B60G 3/26 | |
| | | | 280/124.106 | |
| 6,401,884 B2 | 6/2002 | Norman et al. | | |
| 7,556,130 B2 | 7/2009 | Lamoureux et al. | | |
| 8,827,291 B2 * | 9/2014 | Cronquist | B62B 17/04 | |
| | | | 180/190 | |
| 2001/0033047 A1 * | 10/2001 | Beck | F16F 9/064 | |
| | | | 267/64.16 | |
| 2005/0173213 A1 * | 8/2005 | Coquet | F16F 9/44 | |
| | | | 188/322.13 | |
| 2006/0124371 A1 * | 6/2006 | Montgomery | B62K 25/04 | |
| | | | 180/219 | |
| 2010/0109277 A1 * | 5/2010 | Furrer | B60G 17/08 | |
| | | | 280/124.161 | |
| 2011/0101632 A1 * | 5/2011 | Mochizuki | B60G 17/027 | |
| | | | 280/6.157 | |
| 2011/0121524 A1 * | 5/2011 | Kamioka | B62B 17/062 | |
| | | | 280/5.51 | |
| 2013/0068550 A1 * | 3/2013 | Gale | B60G 3/145 | |
| | | | 180/216 | |
| 2014/0125017 A1 * | 5/2014 | Kasuga | B62K 25/04 | |
| | | | 280/5.514 | |
| 2014/0367930 A1 * | 12/2014 | Zeweke | B60G 17/00 | |
| | | | 280/5.514 | |
| 2015/0290992 A1 * | 10/2015 | Mochizuki | B60G 15/062 | |
| | | | 280/5.514 | |

* cited by examiner

DUAL INLINE HYDRAULIC DEVICE

FIELD OF THE INVENTION

The present invention relates to an inline hydraulic device (hereinafter referred to also in some cases as a "dual" inline hydraulic device, because in some applications, it is advantageous to have a "pair" of inline hydraulic devices). More particularly, in its preferred intended use, the present invention relates to an inline hydraulic device for mechanical assemblies (ex. suspensions, etc.), such as the ones used for shock absorbers on snowmobiles, all-terrain vehicles (ATV) and the like, and also relates to a vehicle including such an inline hydraulic device, and to a method of operating associated thereto.

BACKGROUND OF THE INVENTION

Shock absorbers are well known in the art.

Indeed, conventional shock absorbers generally comprise a hydraulic circuit or path containing fluid (typically oil) for carrying out a damping of shocks that a vehicle may be subjected to when travelling over a given terrain. Essentially, the damping of shocks is done via a restriction of the fluid contained in the hydraulic path of the shock absorber.

Also known in the art are conventional shock absorbers that rely on a compressing of an elastic objet (e.g. spring) for carrying out a corresponding damping of shocks.

Also known in the art are conventional shock absorbers that rely on a combined effect of both a compression of fluid and a compression of a spring.

It is also known in the art that in certain conventional shock absorbers, when the shock compresses, the movement of a corresponding shaft will displace a certain amount of hydraulic fluid (e.g. oil). This displaced oil will pass through adjustments (ex. "shims"). The range of these adjustments can vary the opening of the flow channels for the oil to pass therethrough. If the passage is smaller or reduced, then the oil will encounter more resistance to flow therethrough. If the passage is larger or increased, then the oil will encounter less resistance to flow therethrough. This resistance will permit the shock to absorb a certain amount of energy, depending on the particular static and/or dynamic loads to which the vehicle, including such a conventional shock absorber, is subjected to.

Also known in the art are the following US patents which describe various devices (dampers, stabilizers, shock absorbers, etc.) for use with motorbikes, ATVs and the like: U.S. Pat. Nos. 1,628,811; 1,957,997; 2,009,678; 4,773,514; 5,516,133; and 6,401,884 B2.

Also known to the Applicant is U.S. Pat. No. 5,044,614 granted on Sep. 3, 1991, to John A. Rau, which relates to a shock absorber spring adjuster device. There is described a shock absorber assembly which includes a piston/tube shock mechanism provided with adjustment devices permitting variation of the effective length and thus operating parameters, of a coil spring surrounding the shock mechanism. Adjustment is obtained by the vertical displacement of a member surrounding a body sleeve disposed exteriorly of the shock mechanism and wherein this vertical displacement alters the elevation of one end of the coil spring. A lock nut secures the obtained adjustment and both the member and nut may be manipulated with a simple tool cooperating with a specific configuration on the periphery of the member and nut.

The majority of shock absorbers available on the market now, make it possible to increase or decrease the force applied on the shock absorber spring via a nut located on the absorber body. Typically, these nuts are adjustable using a tool that is provided with the suspension. Also known in the art are the substantial drawbacks associated with these types of conventional adjustment systems in that the adjustment of the nut could become fairly difficult considering the restricted room available around the suspension, such as on an ATV, for example. Also, each shock absorber spring has to be adjusted independently, increasing error in trying to have two or more equal spring preloads. Moreover, another substantial drawback associated with conventional adjustment systems of shock absorbers is that typically, the vehicle has to be stationary and the rider has to disembark from the vehicle, this task being also tedious and time consuming, even with the proper specialty tooling.

It is also known in the art that there are various preload systems for mechanical springs that are currently available on the market. These preload systems are typically used for motorcycles. Generally, an adjusting knob is used to manually move a piston which will displace a fluid into a chamber, said chamber can expand or retract to compensate for displacement changes of the fluid. The preload piston can be placed remotely from the chamber to ease the accessibility of the knob. Fluid from the piston to the chamber will be connected typically with a hose.

Another substantial drawback associated with this conventional type of preload system resides in that, before finding the correct suspension adjustments on an ATV for example, one needs to complete several tests and one cannot interact with the adjustments while riding to face different types of riding conditions or weight distributions on the bike.

Track systems are also well known in the art.

For example, belonging to the Applicant is U.S. Pat. No. 7,556,130 B2 granted on Jul. 7, 2009, to Lamoureux et al. There is described a track system for providing complementary shock absorbing capability to a primary shock absorbing assembly having a hydraulic path containing fluid. The track system includes a chamber, a damping assembly and an adjusting assembly. The chamber has opposite first and second ends, the first end of the chamber being provided with a port operatively connectable to the hydraulic path of the primary shock absorbing assembly, the port being configured for allowing fluid from the hydraulic path of the primary shock absorbing assembly to enter and exit the chamber of the track system through the port thereof. The damping assembly is configured for damping a flow of fluid entering the chamber via the port thereof. The adjusting assembly is configured for adjusting a damping mode of the damping assembly.

However, the above-mentioned conventional assemblies are not configured, designed or even meant for varying an eyelet-to-eyelet distance in response to a given input of a driver of the vehicle.

Figure 1:
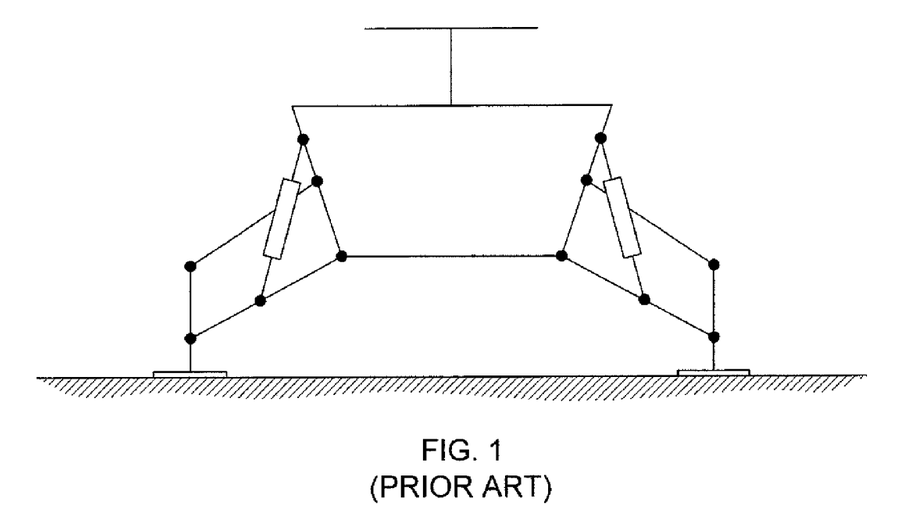
FIG. 1 is a schematic representation of a snowmobile provided with a pair of skis and corresponding independent suspension assemblies according to the prior art.
Figure 2:
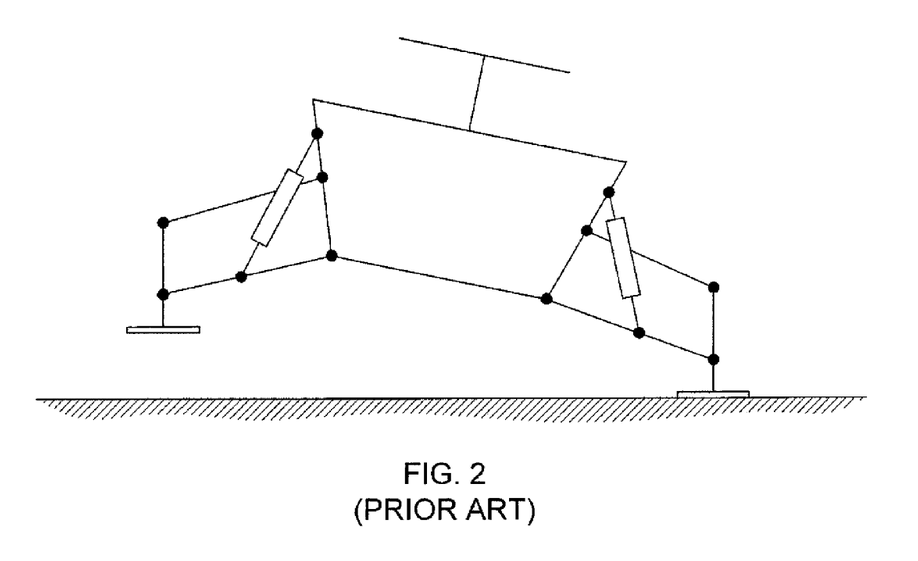
FIG. 2 is another schematic representation of what is shown in FIG. 1, the snowmobile being shown inclined to a side in order to take a turn, thereby resulting in one of the suspension assemblies being raised with respect to the travelling surface (ex. ground, snow, etc.).
Figure 3:
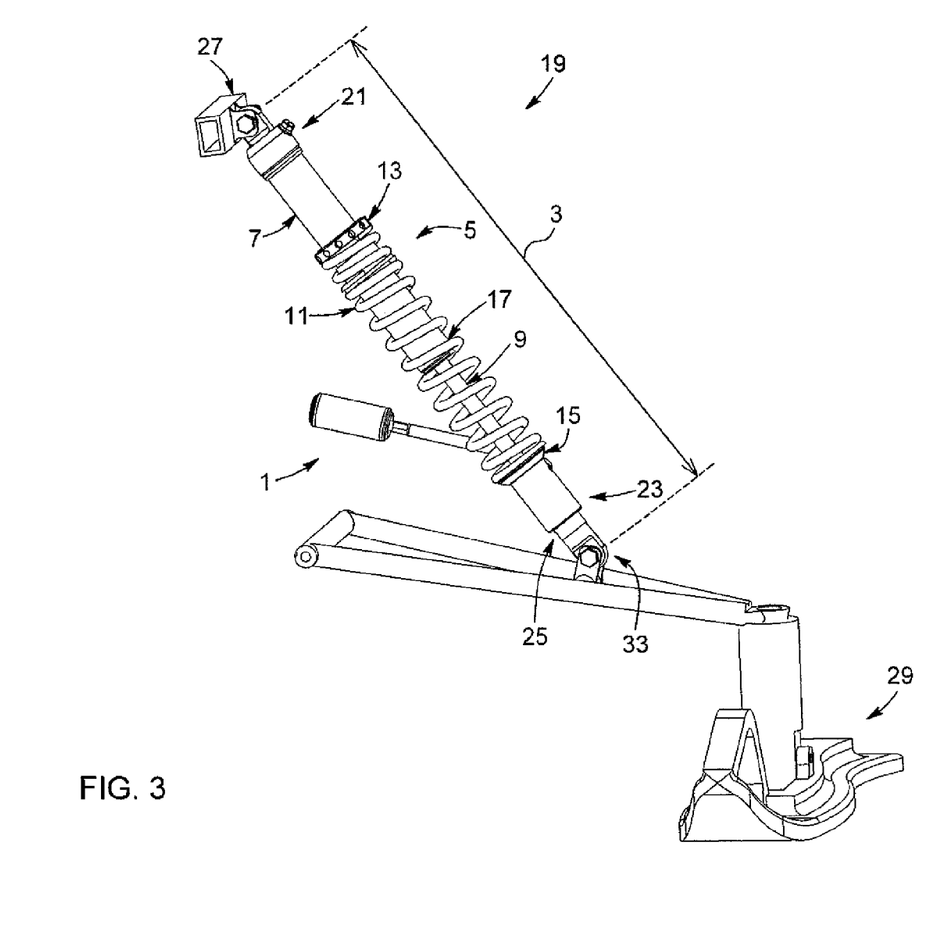
FIG. 3 is a partial schematic representation of a vehicle with a suspension assembly provided with an inline hydraulic device according to a possible embodiment of the present invention.

Indeed, taking the example of a conventional snowmobile, as illustrated in FIGS. 1 and 2, when a snowmobile undertakes a left or a right turn, in some applications, such as "back country", typically, because the suspension assemblies are independent from one and other, the innermost suspension assembly will stay against the given snow on which the snowmobile travels, but the outermost suspension assembly will not always rest against the snow, thereby depriving the snowmobile from a desired traction which is useful for better steering and control of the snowmobile. Therefore, it would be beneficial to provide a system where the eyelet-to-eyelet distance can be varied in response to a steering direction of the vehicle, so that, in the case of a snowmobile for example, the outermost ski may contact the snow when the snowmobile is being turned, for better grip and control, etc.

Hence, in light of the aforementioned, there is a need for an improved device or system which would be able to overcome and/or remedy some of the aforementioned prior art drawbacks.

SUMMARY OF THE INVENTION

An object of the present invention is to provide an inline hydraulic device which, by virtue of its design and components, satisfies some of the above-mentioned needs and which is thus an improvement over other related devices and/or methods known in the prior art.

As will be explained in greater detail hereinbelow, a main advantage of the inline hydraulic device (or "system") according to the present invention is that it is particularly advantageous for mechanical assemblies (ex. suspensions, shock absorbers, etc.) used for snowmobiles, ATVs, cars, trucks, and the like, and consists in the addition of a simple device that can adjust the distance between top and bottom eyelets of a suspension, for example.

Indeed, the present system is meant to provide a system with at least one telescopic component, provided about either one of the top or bottom mounting components, which defines the eyelet-to-eyelet distance, so that by varying a displacement of said telescopic component, whether it be operatively connected to a suspension assembly or not, one can vary the eyelet-to-eyelet distance of the corresponding section of the vehicle, depending on the particular applications for which it is intended for and the desired end results.

Moreover, it is worth mentioning that the adjustment of the telescopic component, and thus, the corresponding variation of the eyelet-to-eyelet distance, is meant to be done in response to a given input of the driver of the vehicle, and such an input can be either a "direct" input (such as, for example, a switching of a button, a pushing of a button, etc.), and/or in an "indirect" input (for example, a steering of the vehicle, an acceleration of the vehicle, a deceleration of the vehicle, etc.). Thus, an important advantage of the present invention is that the system allows an adjustment and/or a variation of the eyelet-to-eyelet distance during operation (use, driving, etc.) of the vehicle itself, by means of such a corresponding input of the driver of the vehicle.

As will be explained in greater detail hereinbelow, the given input may be a mechanical input, such as by means of linkages and other types of connectors, a pneumatic input, a fluid input, an electric input, an electronic input, an electro-mechanical input, a wireless input, and/or any combination thereof, etc. In the context of the present description, and according to a given possible embodiment of the system, an incompressible fluid, such as a hydraulic fluid, for example will be used as the driving component and/or adjustment component, acting on the telescopic component of the present system.

In accordance with the present invention, the above object is achieved, as will be easily understood from the present description, with an inline hydraulic device (or "dual" inline hydraulic device), hereinafter referred to also as "system", such as the one briefly described herein and such as the one exemplified in the accompanying drawings.

More particularly, and according to one aspect of the present invention, there is provided a system for varying an eyelet-to-eyelet distance of a vehicle, the system comprising:

top and bottom mounting components defining the eyelet-to-eyelet distance, the top mounting component being operatively connected to a frame of the vehicle, and the bottom mounting component being operatively connected to a supporting component of the vehicle; and a telescopic component disposed about a housing of at least one of the top and bottom components, the telescopic component being displaceable with respect to said housing in response to a given input of a driver of the vehicle, for varying a distance between the top and mounting components, and thus varying the eyelet-to-eyelet distance of the vehicle.

According to another aspect of the present invention, there is also provided a system for varying an eyelet-to-eyelet distance of a suspension assembly of a vehicle, the system comprising:

a top mounting component operatively connected to a frame of the vehicle;

a bottom mounting component operatively connected to a supporting component of the vehicle, the suspension assembly being operatively disposed between the top and bottom mounting components; and a telescopic component disposed about a housing of at least one of the top and bottom components, the telescopic component being displaceable with respect to said housing in response to a given input of a driver of the vehicle, for varying a distance between the top and mounting components, and thus varying the eyelet-to-eyelet distance of the suspension assembly of the vehicle.

According to another aspect of the invention, there is also provided a vehicle provided with the above-mentioned inline hydraulic device (or "system"). Preferably, the vehicle is a vehicle such as a motorbike, an ATV, a snowmobile, and the like, but it is worth mentioning that various other types of vehicles (cars, trucks, etc.) could benefit from the present dual inline hydraulic device.

According to yet another aspect of the invention, there is also provided a method of operating the above-mentioned inline hydraulic device and/or vehicle.

According to yet another aspect of the invention, there is also provided a method of installing/mounting/securing the above-mentioned inline hydraulic device onto a vehicle.

According to yet another aspect of the invention, there is also provided a kit with components for assembling the above-mentioned inline hydraulic device and/or vehicle.

According to yet another aspect of the present invention, there is also provided a set of components for interchanging with components of the above-mentioned kit.

According to yet another aspect of the present invention, there is also provided a method of assembling components of the above-mentioned kit.

According to yet another aspect of the present disclosure, there is also provided a method of doing business with the above-mentioned inline hydraulic device, vehicle, kit, set and/or methods.

The objects, advantages, and other features of the present invention will become more apparent upon reading of the following non-restrictive description of possible embodiments thereof, given for the purpose of exemplification only, with reference to the accompanying drawings.

DETAILED DESCRIPTION OF PREFERRED EMBODIMENTS OF THE INVENTION

In the following description, the same numerical references refer to similar elements. The embodiments, geometrical configurations, materials mentioned and dimensions shown in the figures are preferred, for exemplification purposes only.

Moreover, although the present invention was primarily designed for use on snowmobiles, ATVs and the like, it may be used with other types of vehicles (cars, trucks, etc.) and/or objects, as apparent to a person skilled in the art. For this reason, expressions such as "snowmobile", "ATV", "vehicle", etc., used herein should not be taken so as to limit the scope of the present invention and include all other kinds of objects, vehicles and/or applications with which the present invention could be used and may be useful, as also apparent to a person skilled in the art.

Moreover, in the context of the present invention, the expressions "inline hydraulic device", "system", "absorber", "device", "unit", "assembly", as well as any other equivalent expressions and/or compound words thereof, may be used interchangeably. The same applies for any other mutually equivalent expressions, such as "snowmobile", "ATV" and "vehicle" for example, as well as "oil", "hydraulic" and "fluid", and "compressing", "extending", "adjusting", "preloading" and "levelling", as also apparent to a person skilled in the art.

In addition, although the preferred embodiments of the present invention as illustrated in the accompanying drawings comprise various components, and although the preferred embodiments of the inline hydraulic device (or "dual" inline hydraulic device) and corresponding parts as shown consist of certain geometrical configurations, as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperations thereinbetween, as well as other suitable geometrical configurations may be used for the inline hydraulic device (or "dual" inline hydraulic device) and corresponding parts according to the present invention, as will be briefly explained herein and as can be easily inferred herefrom, as apparent to a person skilled in the art, without departing from the scope of the present invention.

LIST OF NUMERICAL REFERENCES OF SOME CORRESPONDING POSSIBLE COMPONENTS ILLUSTRATED IN THE ACCOMPANYING DRAWINGS 1. system (or "device")
 3. eyelet-to-eyelet distance
 5. suspension assembly
 7. body (of suspension assembly)
 9. shaft (of suspension assembly)
11. spring (of suspension assembly)
13. preload ring (of suspension assembly)
15. bumper (of suspension assembly)
17. seal head (of suspension assembly)
19. vehicle
21. top mounting component (or top "eyelet", or even top "head")
23. bottom mounting component (or bottom "eyelet")
25. telescopic component (or telescopic "eyelet")
27. frame
29. supporting component
31. housing
33. telescopic eyelet (or telescopic "piston")
35. fluid
37. fluid circuit
39. first fluid circuit (or first closed fluid circuit)
41. second fluid circuit (or second closed fluid circuit)
43. cavity (of housing)
45. primary reservoir of fluid (in telescopic component)
47. port (of telescopic component)
49. hose (or conduit)
51. hose fitting
53. piston chamber
55. mobile main piston (of piston chamber)
57. stroke (or "travel") of mobile main piston (of piston chamber)
59. first subsection (or first sub-chamber, of piston chamber)
61. second subsection (or second sub-chamber, of piston chamber)
63. port (of piston chamber)
65. reservoir cap (of piston chamber)
67. complementary fluid (ex. air, nitrogen, etc.)
69. connecting rod (or transfer rod)
71. first extremity (of connecting rod)
73. second extremity (of connecting rod)
75. outer component
77. steering stem
79. steering clamp (mountable about the steering clamp)
81. joint 83. first component (of joint)
85. second component (of joint)
87. lever arm (of steering clamp)
89. nut
91. seal head (of piston chamber)
93. bushing (of seal head)
95. inner recess (of telescopic component, for receiving fluid therein)
97. gap for fluid (between telescopic component and inner opposing surface)
99. inner opposing surface (of housing)
101. tapered passage (of inner recess)

Broadly described, the "inline hydraulic device" 1 (and/or "dual" inline hydraulic device 1, hereinafter referred to also simply as "device" 1 or "system" 1) according to the present invention, is an hydraulic device 1 with a moving part that has a certain range of motion (stroke and/or travel) which is connected to the chassis and/or a suspension component on a vehicle 19 to either restrict and/or induce its movement. The device 1 can be used in conjunction with a shock absorber, or by itself (i.e. with no shock absorber).

There are several intended uses for the device 1, depending if it is used as a "movement-restricting" device 1 and/or as a "movement-inducing" device 1, for example. Indeed, and as will also be easily understood by a person skilled in the art in light of the present description, the present system 1 could also be used as an "inclination-inducing" device 1 for adjusting the inclination and/or tilt of a given vehicle 19 (such as a car, a motorbike, etc.) by adjusting the eyelet-to-eyelet distance 3 of one or several of the corresponding section(s) of the vehicle 19. Thus, the present system 1 could also be used as an "inclination-inducing" device 1.

Figure 4:
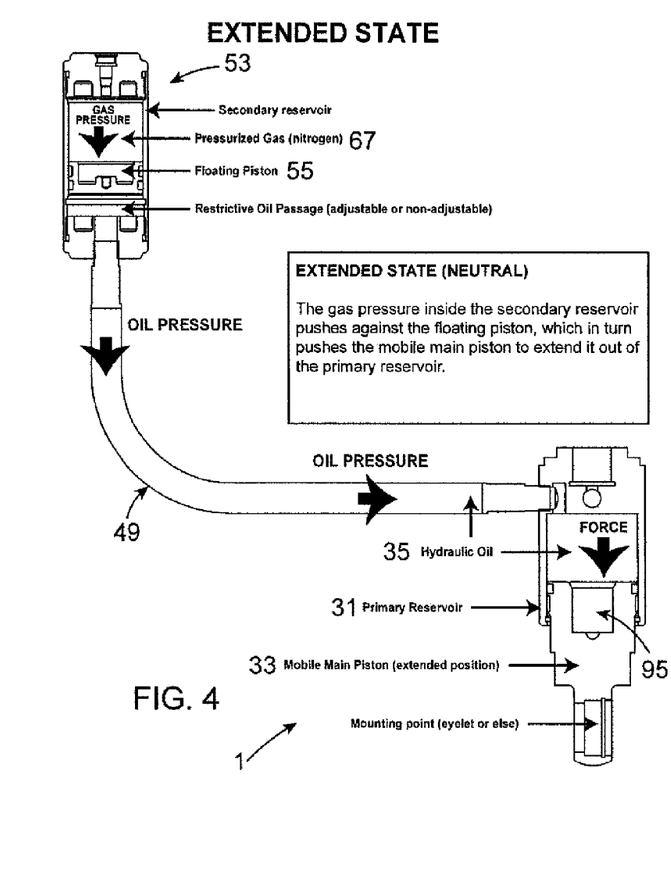
FIG. 4 is a schematic representation of an inline hydraulic device to be used as a movement-restricting device according to a possible embodiment of the present invention, the device being shown in an extended state.
Figure 5:
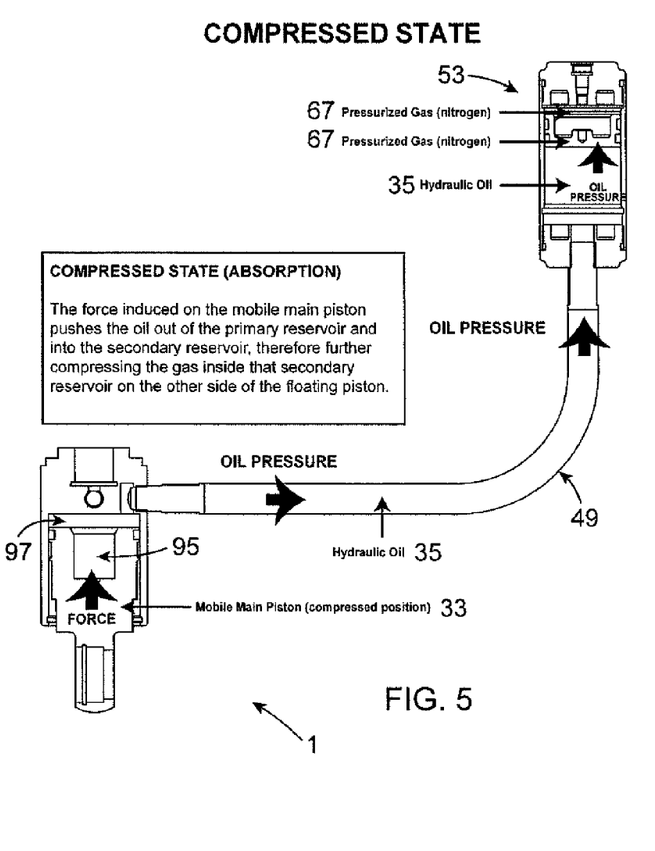
FIG. 5 is another schematic representation of what is shown in FIG. 4, the device being now shown in a compressed state.

As exemplified in FIGS. 4 and 5, when used as a movement-restricting device 1, the inline hydraulic device 1 can control, absorb and progressively stop the movement of the chassis and/or suspension component on a vehicle 19 either on its own and/or to alter the behavior of a shock absorber onto which it would be attached either directly or via a linkage mechanism. In such applications, the device 1 would use hydraulic oil displacement and restriction in a closed system pressurized with a charge of neutral gas, such as nitrogen, for instance. An example of a movement-restricting application could be using the device 1 as a secondary shock absorber acting as a progressive stopper at the final stage of the compression cycle.

Figure 6:
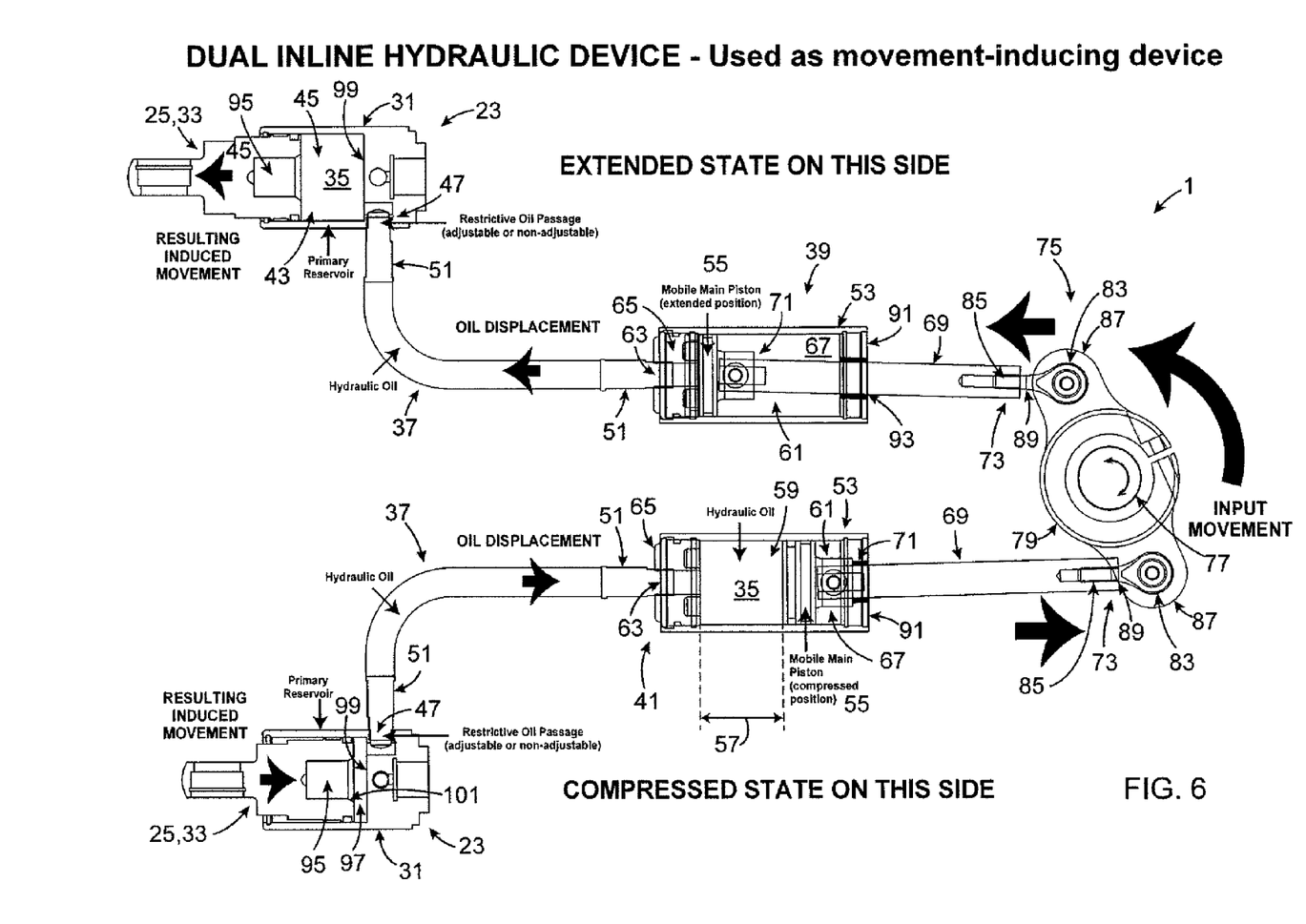
FIG. 6 is a schematic representation of a "dual" inline hydraulic device to be used as a movement-inducing device according to a possible embodiment of the present invention.
Figure 7:
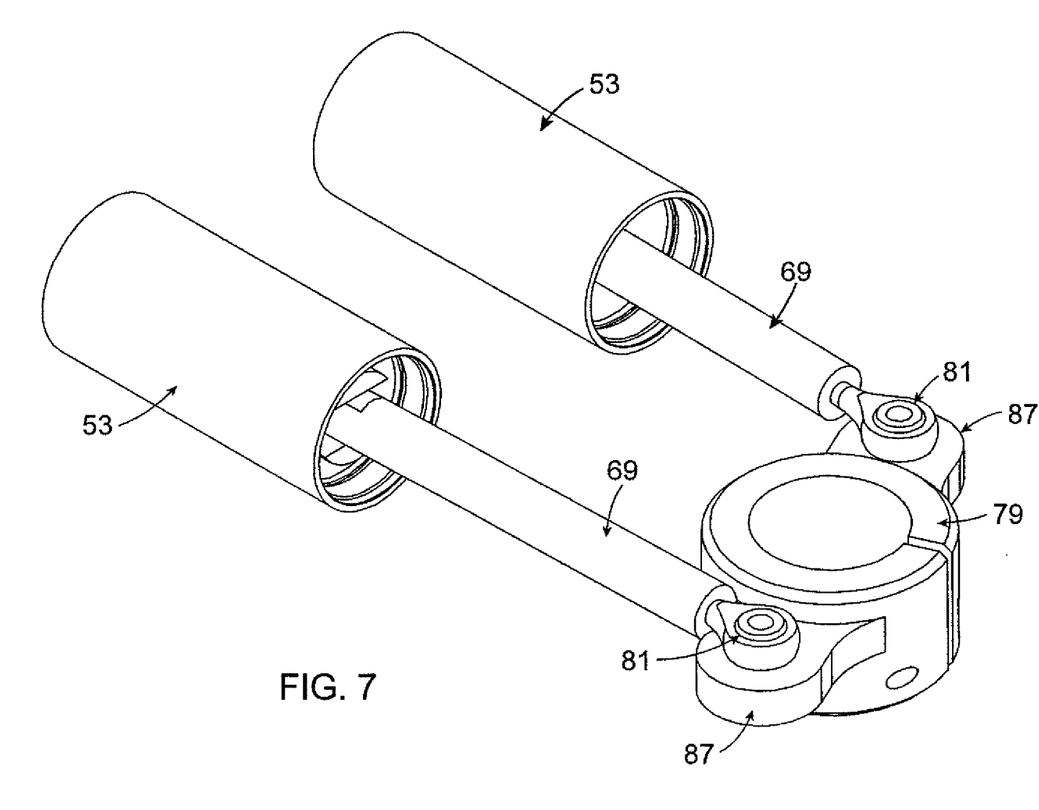
FIG. 7 is a perspective view of some of the component shown in FIG. 6.
Figure 8:
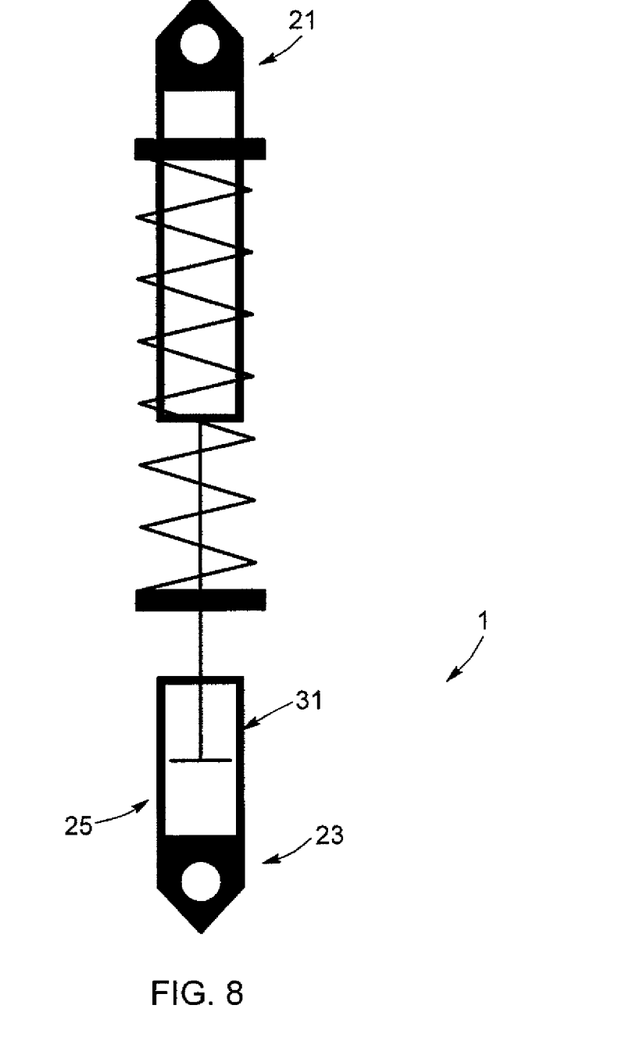
FIG. 8 is a schematic representation of a suspension assembly provided with a telescopic component to be used with an inline hydraulic device according to another possible embodiment of the present invention.
Figure 9:
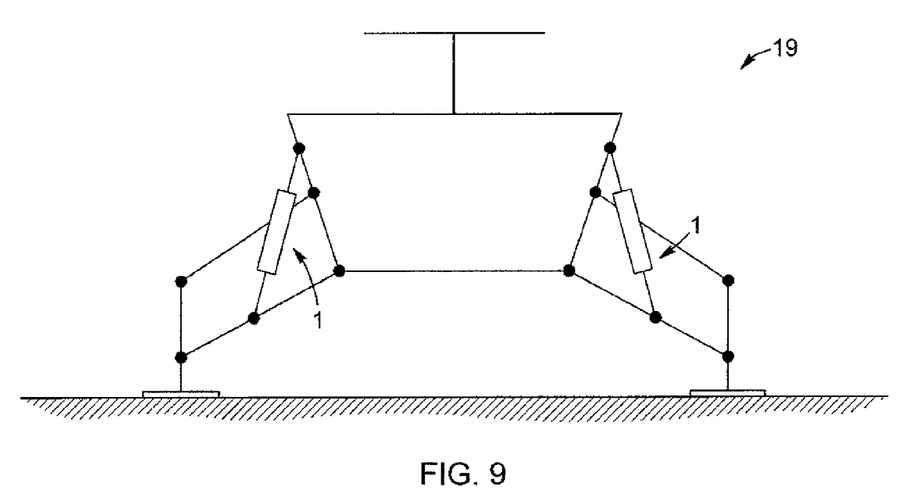
FIG. 9 is a schematic representation of a snowmobile provided with a pair of skis and corresponding suspension assemblies according to a possible embodiment of the present invention.
Figure 10:
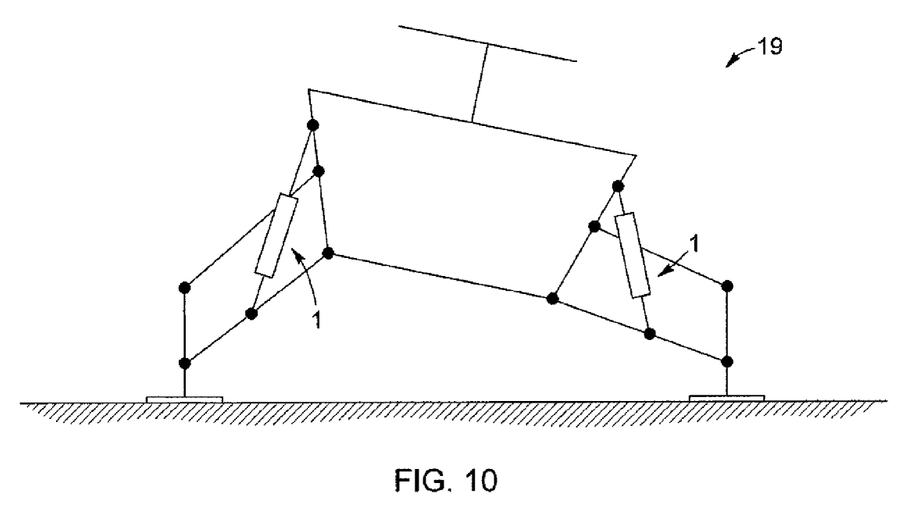
FIG. 10 is another schematic representation of what is shown in FIG. 9, the snowmobile being shown inclined to a side in order to take a turn, with one of the suspension assemblies being extended in order to remain in contact with respect to the travelling surface (ex. ground, snow, etc.).

As exemplified in FIGS. 6 and 7, when used as a movement-inducing device 1, movement induced to one end of the "dual inline hydraulic device" 1 can either extend and/or compress the moving component at the other end. The input movement can be manually induced through a mechanism or automatically induced by weight transfers or in reaction to movement of the wheel(s) via other moving components of the chassis and/or suspension. In such applications, the device 1 would use hydraulic oil displacement to transfer the movement from one end of the device 1 to the other end in a closed system, with or without the use of a neutral gas charge such as nitrogen to pressurize the system. An example of a movement-inducing application could be using the device 1 to transform rider-induced movement such as steering to control vehicle behavior by moving other chassis and/or suspension components via a coupling linkage mechanism.

The different components and features of the present system 1 according to examples of different possible embodiments will be described in greater detail in reference to the accompanying drawings.

For instance, according to one of the possible embodiments exemplified, there can be provided a system 1 for varying an eyelet-to-eyelet distance 3 of a suspension assembly 5 of a vehicle 19, the system 1 comprising: a) a top mounting component 21 operatively connected to a frame 27 of the vehicle 19; b) a bottom mounting component 23 operatively connected to a supporting component 29 of the vehicle 19, the suspension assembly 5 being operatively disposed between the top and bottom mounting components 21,23; and c) a telescopic component 25 disposed about a housing 31 of at least one of the top and bottom components 21,23, the telescopic component 25 being displaceable with respect to said housing 31 in response to a given input of a driver of the vehicle 19, for varying a distance between the top and mounting components 21,23, and thus varying the eyelet-to-eyelet distance 3 of the suspension assembly 5 of the vehicle 19.

As mentioned earlier, the present inline hydraulic system 1 may be used with and/or without a corresponding suspension assembly 5, and in its minimal configuration, it is meant to adjustably vary the eyelet-to-eyelet distance 3 of a corresponding section of a vehicle 19, in response to a given input of a driver of said vehicle 19, either before and/or during the use of the vehicle 19 itself. As it will also be easily understood by a person skilled in the art in light of the present description, the telescopic feature of the selected mounting component(s) of the present system 1 may come in different various different shapes and forms, and only a few examples are given herein.

For example, as better illustrated in FIGS. 4-6, the telescopic component 25 may be displaceable with respect to a housing 31 of at least one of the top and bottom components 21, 23 in response to a steering direction of the vehicle 19. As mentioned earlier, steering of the vehicle 19 is merely but one example of a possible "input" that could be used for activating a displacement of the telescopic component 25 of the present inline hydraulic system 1, and various other types of inputs could be used to either affect "directly" or "indirectly" an adjustment of the telescopic component 25, and thus a variable adjustment eyelet-to-eyelet distance 3 of a corresponding section of the vehicle 19.

As exemplified in the accompanying drawings, the housing 31 can be part of the bottom mounting component 23. It is worth mentioning also that the telescopic feature of the present system 1 could also be provided on the top mounting component 21, as a result, the present system 1 also contemplates the provision of telescopic components 25 on one and/or both of the top and bottom mounting components 21, 23.

The telescopic component 25 may include a telescopic eyelet 33 displaceable with respect to the housing 31, and according to the embodiments illustrated in the accompanying drawings, the telescopic component 25 can be displaceable by means of a fluid 35, preferably provided from a closed fluid circuit 37.

The housing 31 can also include a cavity 43 for receiving a primary reservoir of fluid 45, and the housing 31 may also include a port 47 fluidly connected to the cavity 43 for receiving a primary reservoir of fluid 45. The port 47 can be removably connectable to a hose 49 along which fluid 35 is displaceable, and the port 47 could be removably connectable to the hose 49 by means of a hose fitting 51, for example.

The hose 49 may be removably connectable to a piston chamber 53 into which fluid 35 is allowed to exit and enter, so as to vary an amount of fluid 35 entering and exiting the housing 31, thereby allowing an adjustment of a displacement of the telescopic component 25 with respect to the housing 31, and in turn allowing a corresponding adjustment of the eyelet-to-eyelet distance 3 of the suspension assembly 5 of the vehicle 19.

The piston chamber 53 can include a mobile main piston 55 defining first and second subsections 59, 61 of the piston chamber 53, the mobile main piston 55 being displaceable along the piston chamber 53 for pushing against fluid 35 in the first subsection 59 of the piston chamber 53, out of said piston chamber 53, and into the housing 31 of the telescopic component 25, via a corresponding conduit (ex. hose).

The piston chamber 53 may include a port 63 fluidly connected to the first subsection 59 for receiving fluid 35 from the corresponding conduit. The port 63 can be removably connectable to a hose 49 along which fluid 35 is displaceable. The port 63 can be removably connectable to the hose 49 by means of a hose fitting 51, for example. The port 63 could be provided about a reservoir cap 65 of the piston chamber 53.

The second subsection 61 of the piston chamber 53 can be filled with a complementary fluid 67.

The complementary fluid 67 can be selected from the group consisting of air and nitrogen, for example. Indeed, the second subsection 61 of the piston chamber 53 is preferably filled with a gas, such as air, or nitrogen, the latter being an example of a gas whose properties are not substantially affected when subject to high temperatures. Of course, and as can be easily understood by a person skilled in the art, various other types of different gas can be used in the corresponding second subsection 61 of the piston chamber 53, and ultimately, this second subsection 61 of the piston chamber 53 could be provided with a substantially compressible fluid.

As previously explained, an important aspect of the present system 1 is that one of the top or bottom mounting components 21, 23, or both for that matter, can be provided with a telescopic component 25 that is adjustable in length, so as to in turn adjustably vary the corresponding eyelet-to-eyelet distance 3 of the corresponding section of the vehicle 19 with which the present system 1 is being used. In the context of the present description, it has been exemplified how a "fluid" circuit could be used as a simple, effective and reliable way of adjusting positioning of the telescopic component 25 with respect to its corresponding mounting component 21, 23. However, it is worth mentioning again there are various other types of different means that could be used for adjustably varying the displacement of the telescopic component 25 so as to in turn vary the corresponding eyelet-to-eyelet distance 3 of the corresponding section of the vehicle 19, and other means, such as mechanical means, electrical means, electronic means, pneumatic means, electro-mechanical means (ex. pumps, controllers, etc.) and the like, could be used to act "directly" or "indirectly" onto the telescopic component 25, and in the present case, in the mobile portion of the eyelet 33 which moves "up and down" (or "back and forth", "side to side", etc., depending on the orientation/disposition of the system (1), etc.

In the examples given in the accompanying drawings, a closed fluid circuit 37 has been used, and the mobile piston pump of the piston chamber 53 is preferably displaced via a mechanical component which is either directly or indirectly connected to the given input to be used by the driver of the vehicle 19 in order to act onto the telescopic component 25, and according to a given embodiment of the present system, which consists of having the "steering" of the vehicle 19 as the "input" being used for driving and/or adjusting the telescopic component 25, it will be explained how a simple connecting rod 69 which is operatively connected to steering column of the vehicle 19 can be used in order to activate and/or "drive" the present system 1. Indeed, the mobile main piston 55 of the piston chamber 53 can be displaceable via a corresponding connecting rod 69.

As shown in the Figures, the connecting rod 69 may have a first extremity 71 removably connectable to a rear portion of the mobile main piston 55 of the piston chamber 53 and a second extremity 73 removably connectable to an outer component 75 displaceable in response to the given input of the driver of the vehicle 19. As mentioned, the second extremity 73 of the connecting rod 69 can be displaceable in response to a steering direction of the vehicle 19, for example. The second extremity 73 of the connecting rod 69 may thus be operatively connectable to a steering stem 77 of the vehicle 19. More particularly, and as exemplified in the figures, the second extremity 73 of the connecting rod 69 can be operatively connectable to a steering clamp 79 removably mountable about the steering stem 77. The second extremity 73 of the connecting rod 69 can be operatively connectable to the steering clamp 79 by means of a joint 81. The joint 81 may include a first component 83 mountable onto the steering clamp 79 and a second component 85 removably connectable to the second extremity 73 of the connecting rod 69. The first component 83 of the joint 81 can be mountable onto a corresponding lever arm 87 of the steering clamp 79.

As may be easily appreciated, having different clamps 79 with different lengths of lever arms 87 may be used to in turn vary the rate at which the connecting rods 69 and corresponding mobile main pistons 55 of the piston chambers 53 are displaced at, so as to provide the present system 1 with varying rates of adjustments for the eyelet-to-eyelet distance 3.

Positioning of the second extremity 73 of the connecting rod 69 with respect to the joint 81 may also be adjustable.

It is worth mentioning that various possible means may be used for enabling an adjustment of the connecting rod 69 with respect to the corresponding joint 81. For example, the second component 85 of the joint 81 can be threadedly engageable into the second extremity 73 of the connecting rod 69. Delimitation of the positioning of the second extremity 73 of the connecting rod 69 with respect to the joint 81 can be securable by means of a nut 89, for example.

In a case where the connecting rod 69 is used to transmit the given input to the system 1 by means of a corresponding piston chamber 53, as exemplified in the accompanying drawings, the connecting rod 69 is preferably configured for passing through a seal head 91 of the piston chamber 53. The seal head 91 can be provided with a corresponding bushing 93 for receiving the connecting rod 69. The bushing 93 is configured for ensuring a substantially straight axial displacement of the connecting rod 69 along the piston chamber 53.

As can be easily understood when referring to FIG. 6, the present system 1 is designed so that when the telescopic component 25 is in a "compressed" state, there is still preferably a little gap 97 between the telescopic component 25 and the inner opposing surface 99 of the housing 31, so that a certain amount of fluid 35 may be present therein, so as to facilitate displacement back into an extended state when fluid 35 is pushed back into the housing 31 via an activation of the mobile main piston 55 of the piston chamber 53. Indeed, it is known that displacing the telescopic component 25 would be much easier by the presence of such a fluid gap 97, than attempting to push or introduce fluid 35 between two metallic components that would be flush against one another. Preferably also, and as illustrated in FIGS. 4-6, the telescopic component 25 may include an inner recess 95 in order to accommodate fluid therein, said inner recess 95 may be provided with a tapered passage 101, so as to further facilitate the introduction of fluid 35 into the recess 95 and thereby facilitate pushing of the fluid 35 from the hose 49 against the telescopic component 25. In addition to facilitating or pushing of the fluid 35 against the telescopic component 25, the presence of such an inner recess 95 for the telescopic component 25 also makes it for a lighter component, given than the density of fluid is generally smaller than the density of the metallic materials that are typically used for machining or manufacturing the corresponding eyelet 33 and mounting components 21,23, and in some applications (ex. competitive racing, etc.), any reduction of weight is greatly beneficial.

As previously explained, and according to another aspect of the present invention, there is also provided a kit with corresponding components for assembling an inline hydraulic system 1 such as the one briefly described and such as the one exemplified in the accompanying drawings.

According to another aspect of the present invention, there is also provided with a vehicle 19 which may or may not include a corresponding suspension assembly 5, provided with at least one of an inline hydraulic system 1, such as the one briefly described herein and such as the one exemplified in the accompanying drawings.

The system 1 could be operatively provided about a front or a rear supporting component(s) 29 of the vehicle 19, or on both, depending if we are dealing with a snowmobile, an ATV, a motorbike, a car, a truck, or any other type of vehicle with which the present system 1 could be used for movement-inducing, movement-restriction, and/or inclination-inducing, as aforementioned. Preferably, the vehicle 19 is provided with a pair of systems 1, including first and second systems 1, which may be provided respectively on the front and/or rear portions of the vehicle 19, or on the section where a corresponding component of the vehicle 19 would benefit from the presence of such a system 1.

For example, the first system 1 can be operatively provided about a front supporting component 29 of the vehicle 19 and the second system can be operatively provided about a rear supporting component 29 of the vehicle 19.

Alternatively, the first system 1 could be operatively provided about a front left supporting component 29 of the vehicle 19 and the second system 1 could be operatively provided about a front right supporting component 29 of the vehicle 19.

Alternatively, the first system 1 could be operatively provided about a rear left supporting component 29 of the vehicle 19 and the second system 1 could be operatively provided about a rear right supporting component 29 of the vehicle 19.

On a vehicle 19 having four wheels for example, the vehicle 19 could be provided with four separate inline hydraulic devices 1 according to the present system, one for each wheel assembly, and if need may be, for each corresponding suspension assembly 5.

As a result, a vehicle 19 may be provided with a corresponding inline hydraulic device 1 for each supporting component 29 that it may contain.

It is worth mentioning also that in the context of the present description, "supporting component" 29 may come in various different shapes and forms, depending on the type of vehicles being used, and/or for which the present system 1 is being intended. For example, in the case of a snowmobile, the supporting component 29 may be a corresponding "ski" or "skid", whereas in the case of a motorbike, a car or a truck, the corresponding supporting component 29 may be a corresponding "wheel", or a "plurality of wheels" of the vehicle 19. Thus, it is worth mentioning that the supporting component 29 in the context of the present description is not meant to be used in a restrictive sense, and that the present system 1 could be used in any type of vehicle or device where an eyelet-to-eyelet distance 3 may need to be adjusted via a given input of the driver of the vehicle 19, whether it be before and/or during the use of the vehicle itself, etc.

According to another aspect of the present invention, there is also provided a kit for corresponding components for assembling a vehicle 19 such as the one briefly described herein, and the one exemplified in the accompanying drawings.

According to another aspect of the present system, there is also provided a method of varying an eyelet-to-eyelet distance 3 of at least one section of a vehicle 19, the method comprising the steps of: a) providing top and bottom mounting components 21,23 defining the eyelet-to-eyelet distance 3 of the at least one section of the vehicle 19; b) providing a telescopic component 25 disposed about a housing 31 of at least one of the top and bottom components 21,23, the telescopic component 25 being displaceable with respect to said housing 31 in response to a given input of a driver of the vehicle 19; and c) displacing the telescopic component 25 with respect to the housing 31 via the given input, so as to vary the eyelet-to-eyelet distance 3 of the at least one section of the vehicle 19 accordingly.

Step a) may include the step of providing top and bottom mounting components 21, 23 defining a respective eyelet-to-eyelet distance 3 for a plurality of different sections of the vehicle 19.

Step b) may include the step of providing the telescopic component 25 about a housing 31 of the bottom mounting component 23 of each section of the vehicle 19.

Step c) includes the step of using an input selected from the group consisting of a fluid input, a pneumatic input, a mechanical input, an electric input, an electro-mechanical, an electronic input and a wireless input.

As can be easily understood when referring to the accompanying figures, the working principle behind the "dual inline hydraulic device" 1 is analogous to a DeCarbon-type shock absorber with a main oil reservoir, main activating piston (either full or with shim stack damping), restricted or unrestricted oil passage leading to a secondary reservoir in which a floating piston separates the oil from either a pressurized gas charge, oil reservoir of a shock absorber attached to it or oil chamber of another "dual inline hydraulic device" attached to it. Any movement at one end is reciprocated at the other of the system, either directly or with controlled restriction of the oil flow (adjustable or non-adjustable restriction).

As may now be better appreciated, the "dual inline hydraulic device" 1 is fairly easy to use and install in that it uses widely known mechanisms and principles but its innovative design and way of operating is intended to allow the device 1 to be used in symbiotic conjunction with other mechanisms and devices to open a new world of possible ways to alter the suspension, steering, handling and other behaviors of various types of vehicles. To the Applicant's knowledge, no other existing device (similar or not) can either reduce and/or induce movement with a single device 1 that can be connected to other chassis or suspension components.

As can be easily understood by a person skilled in the art in view of the present description, and in regards to the control system or given input from the driver of the vehicle 19 (or simply, the user of the present system 1), this control system can be manually operated by means of a knob, mechanically, hydraulically, pneumatically or electrically operated, or any combination of the aforementioned description.

The present system 1 can also permit an a restriction and/or a positioning of one of the eyelet with respect to the other, as can be easily understood by a person skilled in the art, by varying the telescopic component by specific increment(s) and/or position(s), as directed by the given input of the system 1 (ex. a steering action of the vehicle, etc.).

In ending, the scope of the claims should not be limited by the possible embodiments set forth in the examples, but should be given the broadest interpretation consistent with the description as a whole.

The invention claimed is:

1. A system for varying an eyelet-to-eyelet distance of a vehicle, the system comprising:
   top and bottom mounting components defining the eyelet-to-eyelet distance, the top mounting component being operatively connected to a frame of the vehicle, and the bottom mounting component being operatively connected to a supporting component of the vehicle; and
   a telescopic component disposed about a housing of at least one of the top and bottom components, the telescopic component being displaceable with respect to said housing in response to a given input of a driver of the vehicle, for varying a distance between the top and mounting components, and thus varying the eyelet-to-eyelet distance of the vehicle;
   wherein the system is operable between compressed and extended states, and wherein the system is configured so that a fluid gap is defined between the telescopic component and an inner opposing surface of the housing when the system is operated in a compressed state.

2. A system according to claim 1, wherein the housing is part of the bottom mounting component.

3. A system according to claim 1, wherein the telescopic component includes a telescopic eyelet displaceable with respect to the housing.

4. A system according to claim 1, wherein the telescopic component is displaceable by a fluid provided from a closed fluid circuit, wherein the housing defines a cavity for receiving a primary reservoir of fluid, wherein the housing includes a port fluidly connected to the cavity for receiving the primary reservoir of fluid, wherein the port is removably connectable to a hose along which fluid is displaceable, and wherein the port is removably connectable to the hose by a hose fitting.

5. A system according to claim 4, wherein the hose is removably connectable to a piston chamber into which fluid is allowed to exit and enter, so as to vary an amount of fluid entering and exiting the housing, thereby allowing an adjustment of a displacement of the telescopic component with respect to the housing, and in turn allowing a corresponding adjustment of the eyelet-to-eyelet distance of the vehicle.

6. A system according to claim 5, wherein the piston chamber includes a mobile main piston defining first and second subsections of the piston chamber, the mobile main piston being displaceable along the piston chamber for pushing against fluid in the first subsection of the piston chamber, out of said piston chamber, and into the housing of the telescopic component, via a corresponding conduit.

7. A system according to claim 6, wherein the piston chamber includes a port fluidly connected to the first subsection for receiving fluid from the corresponding conduit, wherein the port is removably connectable to a hose along which fluid is displaceable, wherein the port is removably connectable to the hose by means of a hose fitting, and wherein the port is provided about a reservoir cap of the piston chamber.

8. A system according to claim 7, wherein the second subsection of the piston chamber is filled with a complementary fluid, and wherein the complementary fluid is selected from the group consisting of air and nitrogen.

9. A system according to claim 6, wherein the mobile main piston of the piston chamber is displaceable via a corresponding connecting rod, wherein the connecting rod has a first extremity removably connectable to a rear portion of the mobile main piston of the piston chamber and a second extremity removably connectable to an outer component displaceable in response to the given input of the driver of the vehicle.

10. A system according to claim 9, wherein the second extremity of the connecting rod is displaceable in response to a steering direction of the vehicle, and wherein the second extremity of the connecting rod is operatively connectable to a steering stem of the vehicle.

11. A system according to claim 10, wherein the second extremity of the connecting rod is operatively connectable to a steering clamp removably mountable about the steering stem, wherein the second extremity of the connecting rod is operatively connectable to the steering clamp by a joint, wherein the joint includes a first component mountable onto the steering clamp and a second component removably connectable to the second extremity of the connecting rod, wherein the first component of the joint is mountable onto a corresponding lever arm of the steering clamp, and wherein positioning of the second extremity of the connecting rod with respect to the joint is adjustable.

12. A system according to claim 11, wherein the second component of the joint is threadedly engageable into the second extremity of the connecting rod, and wherein delimitation of the positioning of the second extremity of the connecting rod with respect to the joint is securable by a nut.

13. A system according to claim 9, wherein the connecting rod is configured for passing through a seal head of the piston chamber, wherein the seal head is provided with a corresponding bushing for receiving the connecting rod, and wherein the bushing is configured for ensuring a substantially straight axial displacement of the connecting rod along the piston chamber.

14. A system according to claim 1, wherein the telescopic component includes an inner recess provided with a tapered passage.

15. A kit with components for assembling a system according to claim 1.

16. A vehicle with a suspension assembly provided with at least one system according to claim 1, said at least one system being operatively provided about a front or a rear supporting component of the vehicle.

* * * * *

UNITED STATES PATENT AND TRADEMARK OFFICE
CERTIFICATE OF CORRECTION

PATENT NO. : 9,573,435 B2  
APPLICATION NO. : 14/327036  
DATED : February 21, 2017  
INVENTOR(S) : Lamoureux et al.

Page 1 of 1

It is certified that error appears in the above-identified patent and that said Letters Patent is hereby corrected as shown below:

On the Title Page

Item (60) "61/884,070 filed on Sep. 29, 2013" should be --61/844,070 filed on July 9, 2013--

Signed and Sealed this  
Tenth Day of March, 2020

Andrei Iancu  
*Director of the United States Patent and Trademark Office*